(12) United States Patent
Ishizaki

(10) Patent No.: US 10,648,525 B2
(45) Date of Patent: May 12, 2020

(54) CABLE ADJUSTER

(71) Applicant: Shimano Inc., Sakai, Osaka (JP)

(72) Inventor: Hiroyuki Ishizaki, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 15/977,149

(22) Filed: May 11, 2018

(65) Prior Publication Data

US 2019/0345997 A1    Nov. 14, 2019

(51) Int. Cl.
| | | |
|---|---|---|
| *B62L 1/06* | (2006.01) | |
| *F16D 65/44* | (2006.01) | |
| *B62L 1/00* | (2006.01) | |
| *B62L 1/16* | (2006.01) | |
| *F16D 41/18* | (2006.01) | |
| *F16D 65/28* | (2006.01) | |
| *F16C 1/22* | (2006.01) | |
| *B62L 3/00* | (2006.01) | |
| *F16D 125/62* | (2012.01) | |

(52) U.S. Cl.
CPC .............. *F16D 65/44* (2013.01); *B62L 1/005* (2013.01); *B62L 1/16* (2013.01); *B62L 3/00* (2013.01); *F16C 1/223* (2013.01); *F16D 41/18* (2013.01); *F16D 65/28* (2013.01); *F16D 2125/62* (2013.01)

(58) Field of Classification Search
CPC .............................. B60T 11/046; B62K 23/06
USPC .... 74/501.5 R, 502.2; 188/2 D, 24.11–24.22
See application file for complete search history.

(56) References Cited

U.S. PATENT DOCUMENTS

| | | | | |
|---|---|---|---|---|
| 3,943,794 | A | * | 3/1976 | Shimada ................ B62M 25/04 74/501.5 R |
| 4,109,769 | A | * | 8/1978 | Darden ...................... B62L 1/10 188/24.17 |
| 5,673,594 | A | * | 10/1997 | Huang ................... B62K 23/06 74/143 |
| 5,819,880 | A | | 10/1998 | Ota et al. |
| 7,802,660 | B2 | | 9/2010 | Tsai |
| 8,006,809 | B2 | * | 8/2011 | Tsai ........................ B60T 7/108 188/2 D |
| 8,662,258 | B2 | | 3/2014 | Watarai et al. |
| 8,863,611 | B2 | * | 10/2014 | Jordan .................... B60T 7/102 74/502.2 |
| 2010/0236874 | A1 | * | 9/2010 | Tsai ...................... B60T 11/046 188/24.22 |

(Continued)

FOREIGN PATENT DOCUMENTS

DE    20 2105 105 337 U    2/2016

*Primary Examiner* — Christopher P Schwartz
(74) *Attorney, Agent, or Firm* — Global IP Counselors, LLP

(57) ABSTRACT

A cable adjuster is provided for a small vehicle including a bicycle. The cable adjuster includes a base portion and a control structure. The control structure includes a first member, a second member and a clutch mechanism. The first member is configured to be rotatably mounted to the base portion about a first axis. The second member is attached to the first member to rotate relative to the first member. The clutch mechanism is configured to transmit rotational force applied to the second member to the first member. The clutch mechanism is also configured to prevent from transmitting rotational force applied on the first member to the second member.

20 Claims, 11 Drawing Sheets

(56) References Cited

U.S. PATENT DOCUMENTS

| | | | |
|---|---|---|---|
| 2010/0270111 A1* | 10/2010 | Tsai | B60T 7/108 188/24.19 |
| 2011/0115189 A1* | 5/2011 | Patterson | B62J 13/04 280/238 |
| 2011/0127119 A1* | 6/2011 | Tsai | B62L 1/10 188/24.19 |
| 2011/0192251 A1* | 8/2011 | Lockett, Jr. | B62K 23/06 74/511 R |

* cited by examiner

CABLE ADJUSTER

CROSS-REFERENCE TO RELATED APPLICATIONS

Background

Field of the Invention

This invention generally relates to a cable adjuster for a small vehicle. More specifically, the present invention relates to a cable adjuster for a cable operated device of a small vehicle.

Background Information

Small vehicles, in particular bicycles, have been provided with cable operated devices. For example, in bicycles, cable operated devices include brake devices, gear changing devices (for example, derailleurs), seatpost, suspensions, etc. Also in bicycles, rim brakes are often provided with a cable adjuster for slightly spreading the brake arms of the rim brake when a wheel will be removed or attached (for example, U.S. Pat. No. 8,662,258). A conventional operating cable for the cable operated devices includes an inner wire and an outer case covering the inner wire. A conventional cable adjuster is configured to adjust a positional relationship between the inner wire and the outer case in the operating cable.

SUMMARY

Generally, the present disclosure is directed to a cable adjuster for a cable operated device of a small vehicle, including a bicycle. Small vehicle as used herein refers to electric and non-electric vehicles regardless of the number of their wheels, but does not include four wheeled vehicles having an internal combustion engine as a power source for driving the wheels, or four wheeled electric vehicles that require a license to operate on public roads.

In one feature, a cable adjuster is provided that a user can selectively adjust a positional relationship between the inner wire and the outer case to set a cable operated device in a preferable state.

In view of the state of the known technology and in accordance with a first aspect of the present disclosure, a cable adjuster for a small vehicle including a bicycle is provided that basically comprises a base portion and a control structure. The control structure includes a first member, a second member and a clutch mechanism. The first member is configured to be rotatably mounted to the base portion about a first axis. The second member is attached to the first member to rotate relative to the first member. The clutch mechanism is configured to transmit rotational force applied to the second member to the first member. The clutch mechanism is also configured to prevent from transmitting rotational force applied on the first member to the second member.

With the cable adjuster according to the first aspect, it is possible to stably retain a state of the cable adjuster.

In accordance with a second aspect of the present invention, the cable adjuster according to the first aspect is configured so that the clutch mechanism includes a ratchet and a pawl. The ratchet is configured to be mounted to one of the base portion and the first member. The pawl is configured to be movably mounted to the other of the base portion and the first member between a ratchet engaged position and a ratchet disengaged position. The pawl is operatively coupled to the second member to move from the ratchet engaged position to the ratchet disengaged position in response to a first rotational movement of the second member relative to the first member in a first rotational direction.

With the cable adjuster according to the second aspect, it is possible to stably retain a state of the cable adjuster while allowing for efficient operation thereof.

In accordance with a third aspect of the present invention, the cable adjuster according to the second aspect is configured so that the clutch mechanism further includes a biasing element that biases the pawl towards the ratchet engaged position.

With the cable adjuster according to the third aspect, it is possible to stably retain a state of the cable adjuster.

In accordance with a fourth aspect of the present invention, the cable adjuster according to the second or third aspect is configured so that the ratchet is configured to be mounted to the base portion, and the pawl is configured to be movably mounted to the first member.

With the cable adjuster according to the fourth aspect, it is possible to stably retain a state of the cable adjuster.

In accordance with a fifth aspect of the present invention, the cable adjuster according to the fourth aspect is configured so that the ratchet includes a ring portion having ratchet teeth circumferentially arranged along a radially inner side of the ring portion, and a key portion projecting from the ring portion to position the ratchet relative to the base portion.

With the cable adjuster according to the fifth aspect, it is possible to stably retain a state of the cable adjuster.

In accordance with a sixth aspect of the present invention, the cable adjuster according to the fourth or fifth aspect is configured so that the one of the second member and the pawl includes a recess, and the other of the second member and the pawl includes a projection that is at least partially disposed in the recess.

With the cable adjuster according to the sixth aspect, it is possible to stably retain a state of the cable adjuster.

In accordance with a seventh aspect of the present invention, the cable adjuster according to the sixth aspect is configured so that the second member includes the recess and the pawl includes the projection.

With the cable adjuster according to the seventh aspect, it is possible to stably retain a state of the cable adjuster.

In accordance with an eighth aspect of the present invention, the cable adjuster according to the sixth or seventh aspect is configured so that the recess is larger than the projection to allow a movement of the pawl relative to the ratchet in response to a second rotational movement of the second member relative to the first member in a second rotational direction that is opposite to the first rotational direction.

With the cable adjuster according to the eighth aspect, it is possible to efficiently move the cable adjuster while stably retain a state of the cable adjuster.

In accordance with a ninth aspect of the present invention, the cable adjuster according to any one of the second to eighth aspects is configured so that the ratchet includes at least three ratchet teeth that are selectively engaged with the pawl to establish at least three cable positions.

With the cable adjuster according to the ninth aspect, it is possible to provide a plurality of positions for the cable adjuster, thereby providing a plurality of positions of a subject controlled by the cable adjuster, for example, a plurality of positions of a brake shoe relative to a rim of a wheel.

In accordance with a tenth aspect of the present invention, the cable adjuster according to any one of the first to ninth aspects is configured so that the second member is configured to rotate within a predetermined rotational movement range relative to the first member and to rotate with the first member after rotational movement past the predetermined rotational movement range.

With the cable adjuster according to the tenth aspect, it is possible to quickly release the cable adjuster if desired.

In accordance with an eleventh aspect of the present invention, the cable adjuster according to the tenth aspect is configured so that one of the first and second members includes at least one slot, and the other of the first and second members includes at least one protrusion. The at least one protrusion is at least partially disposed in the at least one slot to limit relative rotational movement of the second member relative to the first member to the predetermined rotational movement range.

With the cable adjuster according to the eleventh aspect, it is possible to quickly release the cable adjuster if desired.

In accordance with a twelfth aspect of the present invention, the cable adjuster according to the eleventh aspect is configured so that the at least one slot includes a pair of slots and the at least one protrusion includes a pair of protrusions.

With the cable adjuster according to the twelfth aspect, it is possible to quickly release the cable adjuster if desired.

In accordance with a thirteenth aspect of the present invention, the cable adjuster according to any one of the first to twelfth aspects is configured so that the second member includes a user operating portion.

With the cable adjuster according to the thirteenth aspect, it is possible to facilitate operating the cable adjuster.

In accordance with a fourteenth aspect of the present invention, the cable adjuster according to any one of the first to thirteenth aspects is configured so that the second member rotates relative to the first member about a second axis that is parallel to and offset from the first axis.

With the cable adjuster according to the fourteenth aspect, it is possible to stably retain a state of the cable adjuster.

In accordance with a fifteenth aspect of the present invention, the cable adjuster according to any one of the first to fourteenth aspects further comprises a cable attachment rotatably supported on the first member.

With the cable adjuster according to the fifteenth aspect, it is possible to securely retain an operating cable.

In accordance with a sixteenth aspect of the present invention, the cable adjuster according to the fifteenth aspect is configured so that the cable attachment rotates relative to the first member about a second axis that is parallel to and offset from the first axis.

With the cable adjuster according to the sixteenth aspect, it is possible to efficiently operate the cable adjuster.

In accordance with a seventeenth aspect of the present invention, the cable adjuster according to the sixteenth aspect is configured so that the first member includes a cylindrically shaped outer surface having a center of curvature coinciding with the first axis, and an attachment bore defining the second axis. The cable attachment includes a rod portion rotatably disposed in the attachment bore.

With the cable adjuster according to the seventeenth aspect, it is possible to efficiently operate the cable adjuster.

In accordance with an eighteenth aspect of the present invention, the cable adjuster according to the seventeenth aspect further comprises a threaded fastener having a head portion contacting the first member and a threaded shaft portion threaded into a threaded bore of the rod portion of the cable attachment.

With the cable adjuster according to the eighteenth aspect, it is possible to securely retain an operating cable.

In accordance with a nineteenth aspect of the present invention, the cable adjuster according to any one of the fifteenth to eighteenth aspects is configured so that the cable attachment further includes a first inner wire contact portion that is stationary with respect to the rod portion, a second inner wire contact portion that is movable with respect to the first inner wire contact portion, and a fixing member movably coupling the second inner wire contact portion to the first inner wire contact portion.

With the cable adjuster according to the nineteenth aspect, it is possible to securely retain an operating cable.

In accordance with a twentieth aspect of the present invention, a rim including the cable adjuster according to any one of the first to nineteenth aspects, and the rim brake further comprises a first brake arm and a second brake arm. The first brake arm includes a first brake shoe attachment structure, and an outer casing receiving structure. The second brake arm includes a second brake shoe attachment structure and the base portion.

With the rim brake according to the twentieth aspect, it is possible to provide the rim brake with a cable adjuster that stably retains a state thereof.

Also, other objects, features, aspects and advantages of the disclosed cable adjuster will become apparent to those skilled in the art from the following detailed description, which, taken in conjunction with the annexed drawings, discloses preferred embodiments of the cable adjuster.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the small vehicle field (particularly the bicycle field) from this disclosure that the following descriptions of the embodiments are provided for illustration only and not for the purpose of limiting the invention as defined by the appended claims and their equivalents.

Figure 1:
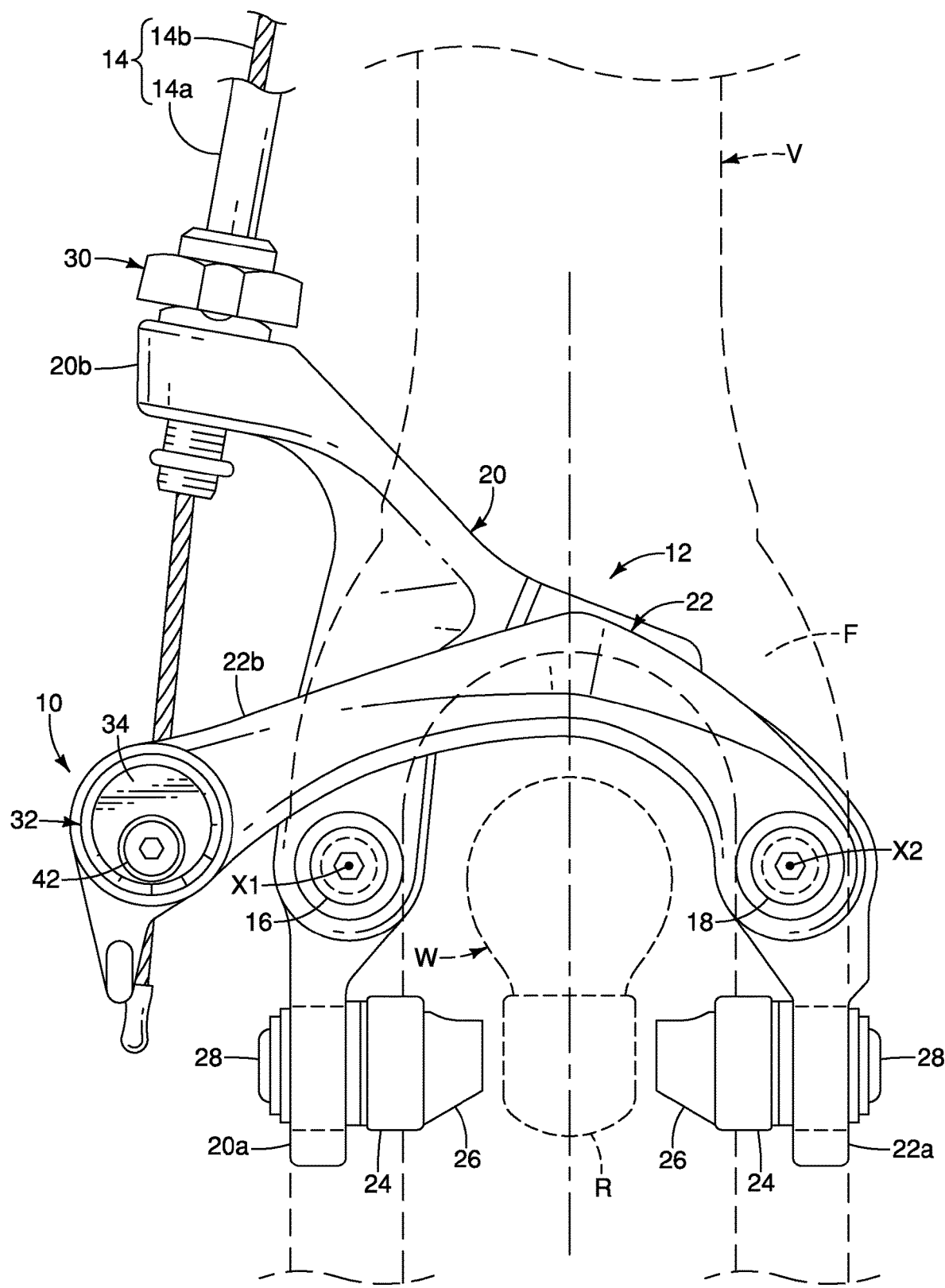
FIG. 1 is a partial front elevational view of a portion of a bicycle having a rim brake that includes a cable adjuster in accordance with one illustrative embodiment.
Figure 2:
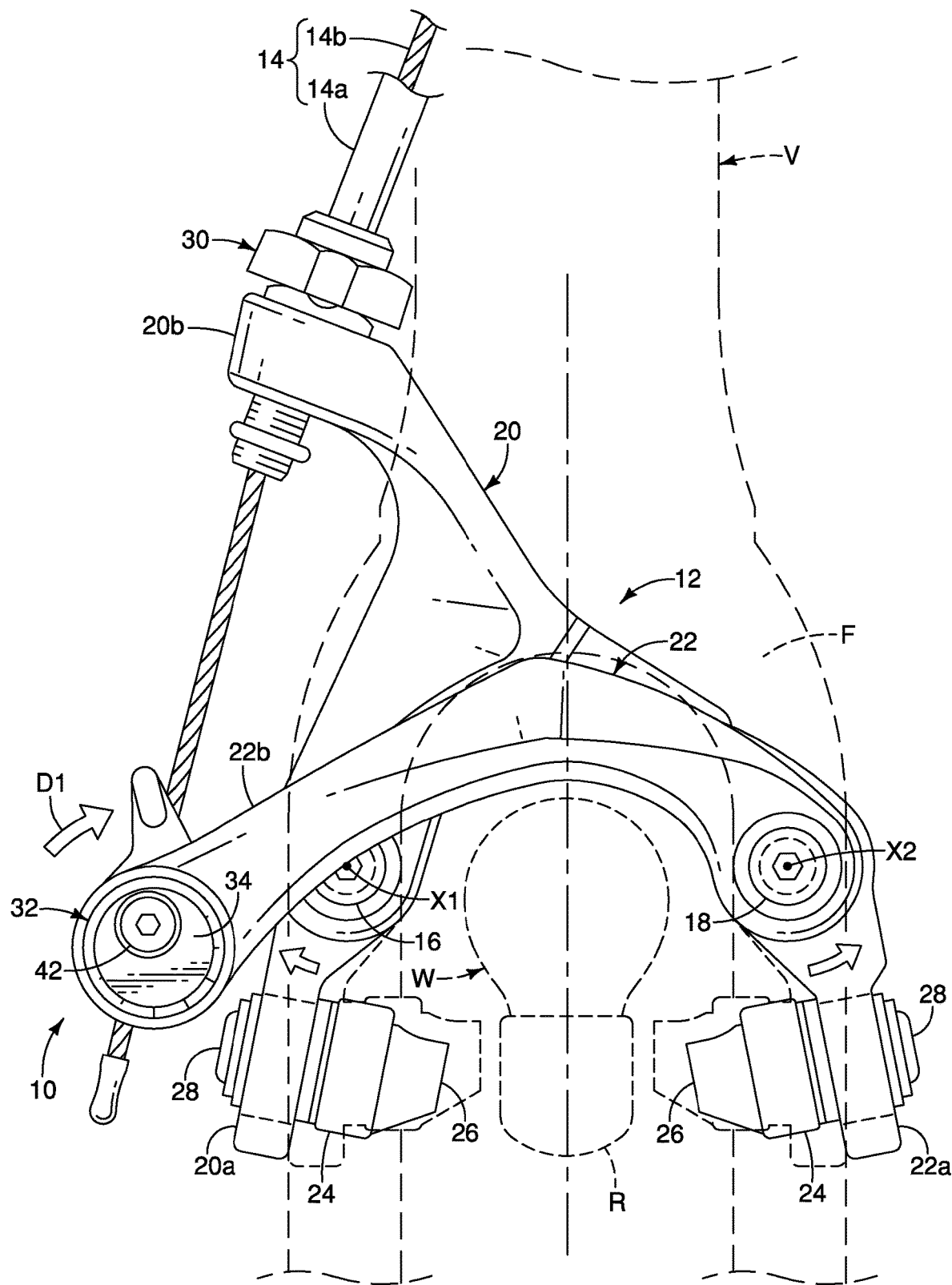
FIG. 2 is a partial front elevational view of the bicycle portion of the bicycle illustrated in FIG. 1, in which the cable adjuster has been moved from a first end position of FIG. 1 to a second end position.

Referring initially to FIGS. 1 and 2, a cable adjuster 10 is provided for a small vehicle V including a bicycle. In the illustrated embodiment, a rim brake 12 includes the cable adjuster 10. However, it will be apparent from this disclosure that the cable adjuster 10 can be used with other cable operated components and is not limited to a rim (caliper) brake.

Basically, the rim brake 12 is operated by an operating cable 14 that has an outer case 14a covering an inner wire 14b. The cable adjuster 10 is attached to the inner wire 14b of the operating cable 14. In other words, in the illustrated embodiment, the operating cable 14 is a Bowden type cable in which the inner wire 14b is slidably received within the outer case 14a. A bicycle operating device (not shown) operates the rim brake 12 by selectively pulling and releasing the inner wire 12b. In this way, the rim brake 12 selectively applies a braking force to a bicycle rim R of a bicycle wheel W. As explained below, the cable adjuster 10 is constructed to selectively establish a plurality of positions of the inner wire 14b with respect to the outer case 14a. In this way, a user can adjust a state of the cable operated component (for example, a rim brake) using the cable adjuster 10.

Figure 3:
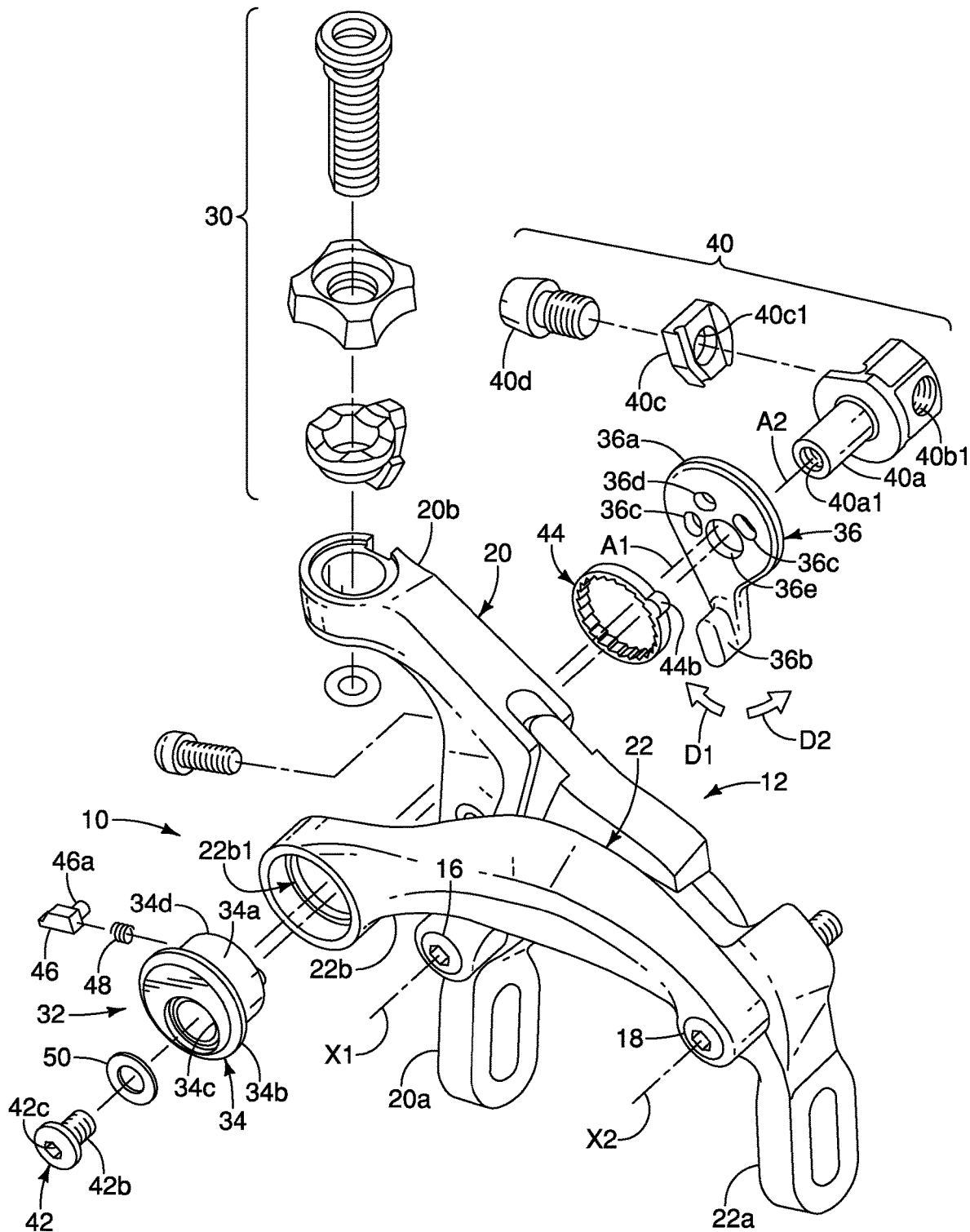
FIG. 3 is an exploded perspective view of the rim brake illustrated in FIGS. 1 and 2.

Here, the rim brake 12 is directly mounted to a frame body F (for example, a front fork) of the small vehicle V (for example, the bicycle) by a first fixing bolt 16 and a second fixing bolt 18. More specifically, the rim brake 12 further comprises a first brake arm 20 and a second brake arm 22. The first brake arm 20 is pivotally mounted to the frame body F by the first fixing bolt 16, while the second brake arm 22 is pivotally mounted to the frame body F by the second fixing bolt 18. The first fixing bolt 16 defines a first pivot axis X1, while the second fixing bolt 18 defines a second pivot axis X2. The first and second pivot axes X1 and X2 are parallel and disposed on opposite sides of the bicycle wheel W. In the illustrated embodiment, the rim brake 12 is a symmetrical dual-pivot rim (caliper) brake, which is a direct mount brake caliper. However, the cable adjuster 10 can be used with other types of rim (caliper) brakes, such as a single pivot rim (caliper) brake and a dual pivot rim (caliper) brake that is an indirect mount. Further, the cable adjuster 10 can be used with any other type of bicycle component, such as a mechanical disc brake caliper, a speed changing device including a derailleur and an internal hub gear, and so on. The first brake arm 20 includes a first brake shoe attachment structure 20a, and an outer casing receiving structure 20b. The second brake arm 22 includes a second brake shoe attachment structure 22a and a base portion 22b. The rim brake 12 further includes a pair of brake shoes 24 that each includes a friction member 26. The brake shoes 24 are adjustably attached to the first and second brake shoe attachment structures 20a and 22a by a pair of attachment bolts 28. In particular, each of the first and second brake shoe attachment structures 20a and 22a has a slot, as shown in FIG. 3, for receiving one of the attachment bolts 28 for adjusting the brake shoes 24 in a conventional manner. Here, the outer casing receiving structure 20b is provided with a barrel adjuster 30 that adjusts the end position of an end of the outer case 14a of the operating cable 14.

Since rim brakes are well known, the conventional parts of the rim brake 12 will not be discussed in detail herein for the sake of brevity. Basically, a bicycle operating device (not shown) operates the rim brake 12 by selectively pulling and releasing the inner wire 14b, which in turn rotates the first and second brake arms 20 and 22 about the first and second pivot axes X1 and X2, respectively. In this way, the friction members 26 of the rim brake 12 contact the bicycle rim R to apply a braking force to the bicycle rim R.

Figure 4:
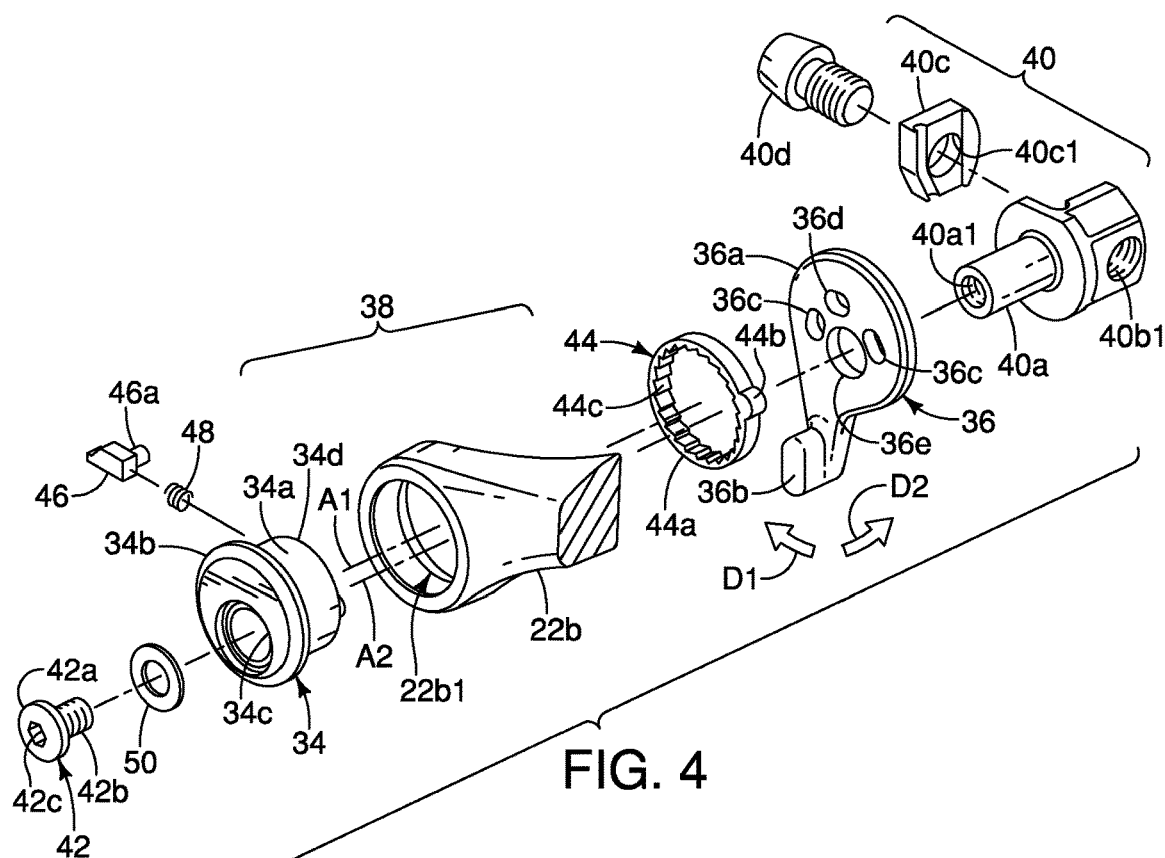
FIG. 4 is an exploded, front side perspective view of the rim brake illustrated in FIGS. 1 to 3.
Figure 5:
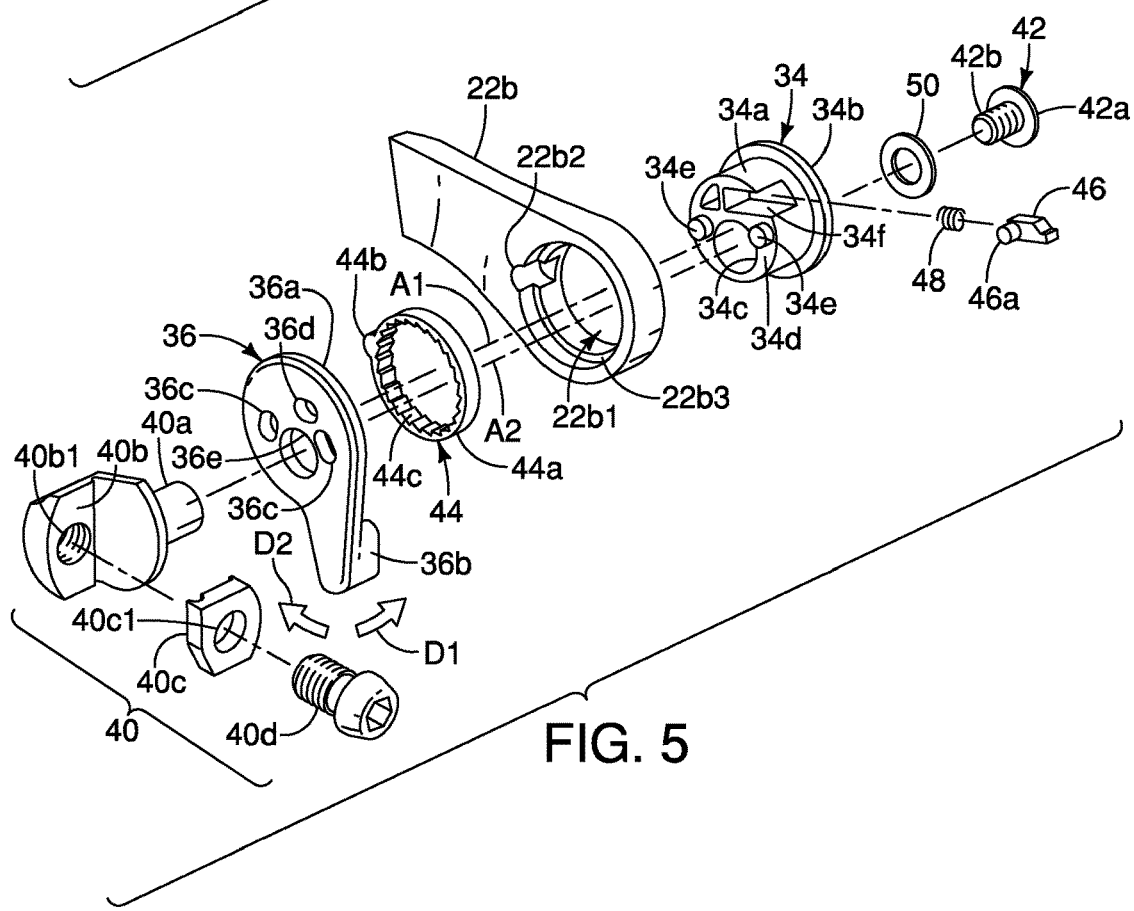
FIG. 5 is an exploded, rear side perspective view of the rim brake illustrated in FIGS. 1 to 3.

Referring now to FIGS. 3 to 5, the cable adjuster 10 will now be discussed in more detail. Here, in the illustrated embodiment, the cable adjuster 10 is integrated into the base portion 22b of the second brake arm 22. Thus, the cable adjuster 10 basically comprises the base portion 22b and a control structure 32 (FIG. 3). The base portion 22b includes an opening 22b1 for receiving the control structure 32. The control structure 32 basically includes a first member 34, a second member 36 and a clutch mechanism 38 (FIG. 4). Preferably, as in the illustrated embodiment, the cable adjuster 10 further comprises a cable attachment 40 rotatably supported on the first member 34. The cable adjuster 10 further comprises a threaded fastener 42. The threaded fastener 42 is configured to attach the cable attachment 40 to the first member 34 such that the cable attachment 40 can rotate relative to the first member 34 as explained below. The threaded fastener 42 is configured to attach the second member 36 to the first member 34 as explained below.

Basically, the first member 34 is configured to be rotatably mounted to the base portion 22b about a first axis A1. As explained below, the second member 36 is attached to the first member 34 to rotate relative to the first member 34.

Figure 13:
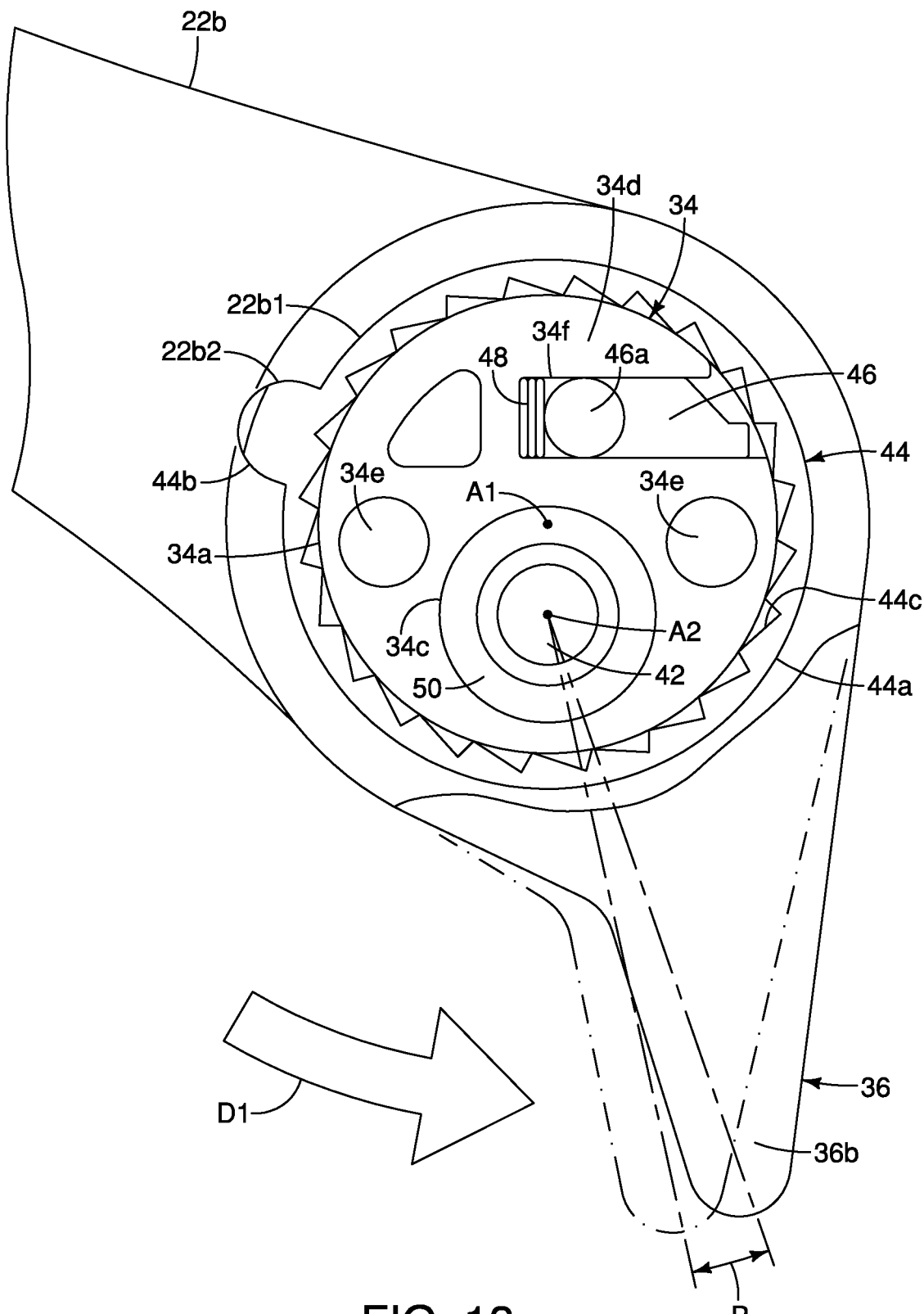
FIG. 13 is a partial rear elevational view of the base portion of the brake arm illustrated in FIG. 12, but in which a portion of the second member of the cable adjuster is broken away.
Figure 14:
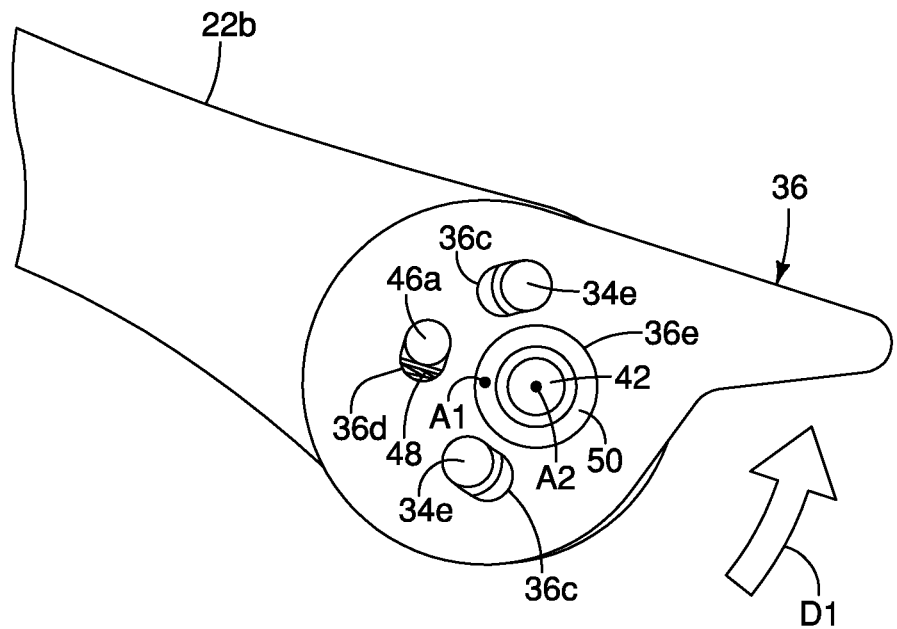
FIG. 14 is a partial rear elevational view, similar to FIG. 9, of the base portion of the brake arm, but in which the cable adjuster has been moved from the first end position toward the second end position.
Figure 15:
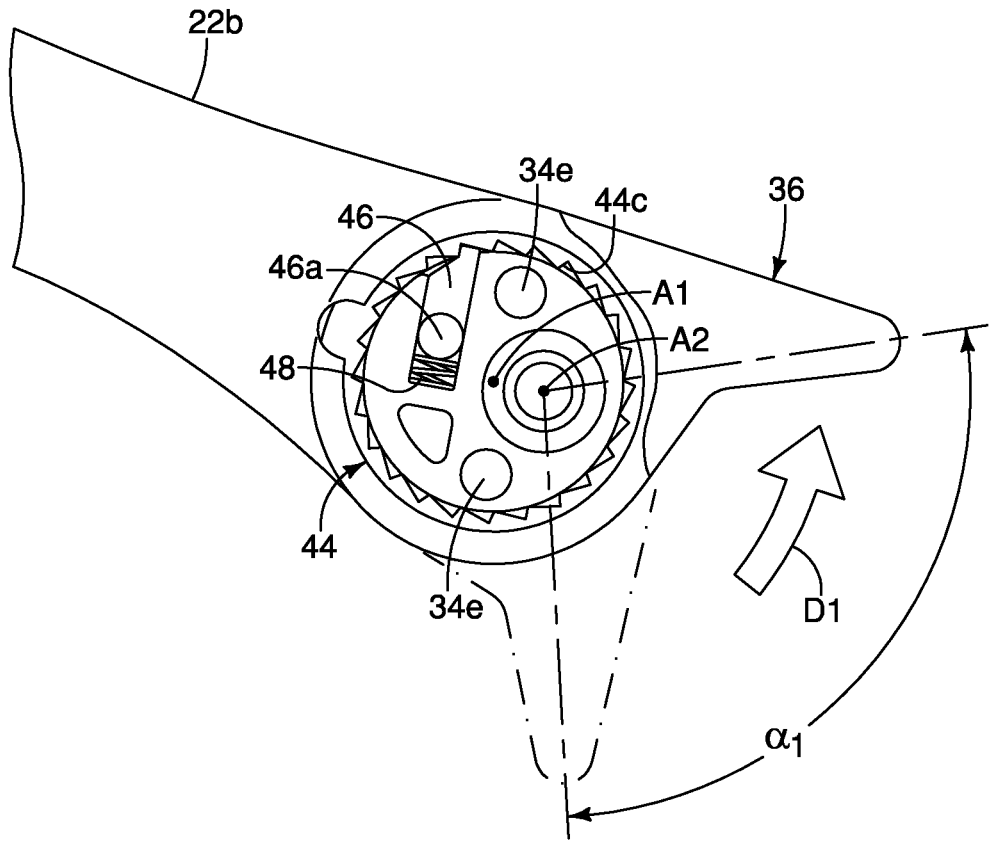
FIG. 15 is a partial rear elevational view of the base portion of the brake arm illustrated in FIG. 14, but in which a portion of the second member of the cable adjuster is broken away.

More specifically, initially, the second member 36 rotates relative to the first member 34 about a second axis A2 that is parallel to and offset from the first axis A1. The second member 36 is further configured to rotate within a predetermined rotational movement range P, as shown in FIG. 13, relative to the first member 34 and to rotate with the first member 34 after rotational movement past the predetermined rotational movement range P. In other words, when a user wants to increase the clearance between the bicycle rim R and the brake shoes 24, the user initially pivots the second member 36 about the second axis A2 relative to the first member 34 which operates the clutch mechanism 38 to allow rotational movement of the first member 34 with respect to the base portion 22b about the first axis A1 in a first direction D1. As shown in FIGS. 13 to 15, continued rotation of the second member 36 in the first direction D1 past the rotational movement range P causes the first member 34 to rotate with the second member 36. The clutch mechanism 38 is configured to transmit rotational force applied to the second member 36 to the first member 34. The clutch mechanism 38 is also configured to prevent from transmitting rotational force applied on the first member 34 to the second member 36. In this way, as explained below, the clutch mechanism 38 is a one-way clutch that allows a user to selectively establish a plurality of positions of the inner wire 14b with respect to the outer case 14a for stepwise clearance degrees between the bicycle rim R and the brake shoes 24.

As shown in FIGS. 3 to 5, the first member 34 includes a cylindrically shaped outer surface 34a having a center of curvature coinciding with the first axis A1. The cylindrically shaped outer surface 34a extends axially from a flanged portion 34b of the first member 34. An outer diameter of the flanged portion 34b is larger than an outer diameter of the cylindrically shaped outer surface 34a. An attachment bore 34c defines the second axis A2. As shown in FIGS. 4 and 5, the attachment bore 34c extends from the flanged portion 34b to an axial end surface 34d of the cylindrically shaped outer surface 34a.

Figure 9:
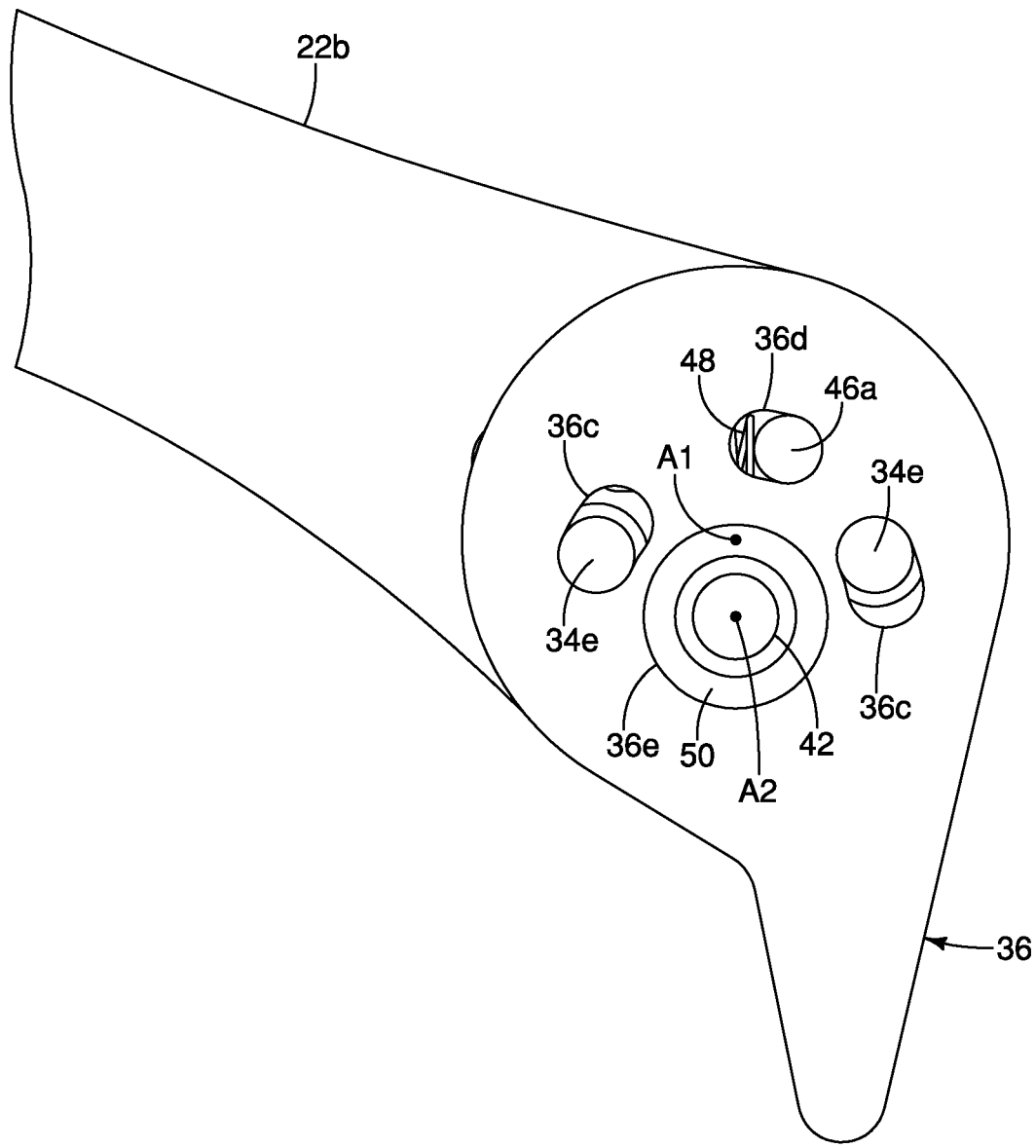
FIG. 9 is a partial rear elevational view, similar to FIG. 6, of the base portion of the brake arm, but in which a cable attachment of the cable adjuster is removed.

As shown in FIGS. 5 and 9, at least one protrusion 34e extends outwardly in the axial direction from the axial end surface 34d of the first member 34. Preferably, as shown in the illustrated embodiment, there are two protrusions 34e extending outwardly in the axial direction from the axial end surface 34d of the first member 34. The pair of protrusions 34e are diametrically opposed on the axial end surface 34d.

Figure 10:
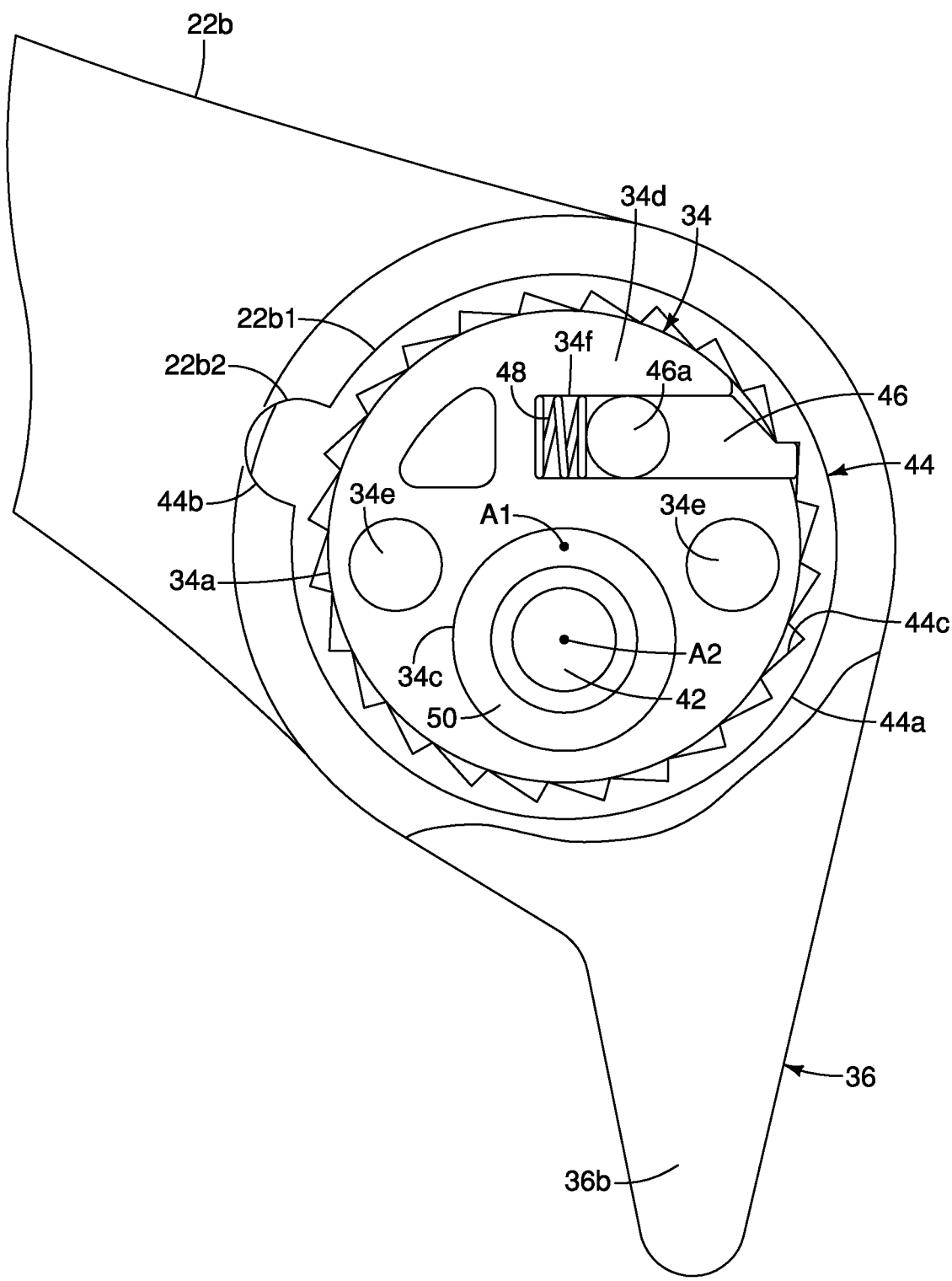
FIG. 10 is a partial rear elevational view, similar to FIG. 6, of the base portion of the brake arm, but in which the cable attachment of the cable adjuster is removed and in which a portion of a second member of the cable adjuster is broken away.

As shown in FIGS. 5, 10 and 13, a cutout portion 34f is disposed in the axial end surface 34d. The cutout portion 34f extends inwardly from the cylindrically shaped outer surface 34a. As shown in FIG. 5, the cutout portion 34f extends axially from the axial end surface 34d toward the flanged portion 34b.

As shown in FIGS. 3 to 5, the second member 36 includes an attachment portion 36a. The second member 36 includes a user operating portion 36b. The user operating portion 36b is preferably integrally formed with the attachment portion 36a to facilitate gripping and operation of the second member 36. The attachment portion 36a of the second member 36 includes at least one slot 36c and at least one recess 36d. In the illustrated embodiment, the second member 36 has a pair of slots 36c corresponding to the pair of protrusions 34e. The attachment portion 36a further includes an attachment bore 36e having an axis coaxial with the second axis A2. The at least one slot 36c, the at least one recess 36d and the attachment bore 36e extend completely through the attachment portion 36a of the second member 36 in the axial direction. As shown in FIGS. 9 and 13, the attachment bore 36e is preferably substantially circular when viewed in the axial direction, and the at least one slot 36c and the at least one recess 36d are preferably non-circular, such as an elongated slot, when viewed in the axial direction.

One of the first and second members 34 and 36 includes the at least one slot 36c, and the other of the first and second members 34 and 36 includes the at least one protrusion 34e. As shown in FIG. 13, the at least one protrusion 34e is at least partially disposed in the at least one slot 36c to limit relative rotational movement of the second member 36 relative to the first member 34 to the predetermined rotational movement range P. Here, in the illustrated embodiment, the at least one slot 36c includes the pair of slots 36c and the at least one protrusion 34e includes the pair of protrusions 34e. As shown in FIGS. 3 to 5, the first member 34 includes the at least one protrusion 34e and the second member 36 includes the at least one slot 36c.

The clutch mechanism 38 includes a ratchet 44 and a pawl 46. The ratchet 44 is configured to be mounted to one of the base portion 22b and the first member 34. The pawl 46 is configured to be movably mounted to the other of the base portion 22b and the first member 34 between a ratchet engaged position (FIG. 10) and a ratchet disengaged position (FIG. 13). The pawl 46 is operatively coupled to the second member 36 to move from the ratchet engaged position (FIG. 10) to the ratchet disengaged position (FIG. 13) in response to a first rotational movement of the second member 36 relative to the first member 34 in a first rotational direction D1.

As shown in FIGS. 4, 5 and 10, the ratchet includes a ring portion 44a and a key portion 44b. The ratchet 44 includes a plurality of ratchet teeth 44c arranged along an arc having a center of curvature on the first axis A1. The ratchet teeth 44c extend inwardly from an inner surface of the ring portion 44a toward the first axis A1. In the illustrated embodiment, as shown in FIGS. 3 to 5, the ratchet 44 is configured to be mounted to the base portion 22b, and the pawl 46 is configured to be movably mounted to the first member 34. The ring portion 44a of the ratchet 44 has the ratchet teeth 44c circumferentially arranged along a radially inner side of the ring portion 44a. The key portion 44b projects from the ring portion 44a to position the ratchet relative to the base portion 22b. The key portion 44b extends outwardly from an outer surface of the ring portion 44a. In the illustrated embodiment, the ratchet 44 is disposed in the opening 22b1 of the base portion 22b such that the key portion 44b is received by a key receiving portion 22b2 of the base portion 22b, thereby substantially preventing rotation of the ratchet 44 relative to the base portion 22b. A shoulder 22b3 (FIG. 5) of the base portion 22b limits an insertion depth of the ratchet 44 with respect to the base portion 22b.

As shown in FIGS. 4, 5 and 10, the pawl 46 is disposed in the cutout portion 34f of the first member 34. As shown in FIG. 10, the clutch mechanism 38 further includes a biasing element 48 that biases the pawl 46 towards the ratchet engaged position. As shown in FIGS. 10 and 13, the biasing element 48, such as a spring member, is disposed between an end of the cutout portion 34f and an end of the pawl 46. A first end of the biasing element 48 engages the pawl 46 and a second end of the biasing element 48 engages the end of the cutout portion 34f of the first member 34. The cutout portion 34f guides movement of the pawl 46 in a direction substantially perpendicular to the first and second axes A1 and A2.

The one of the second member 36 and the pawl 46 includes a recess 36d, and the other of the second member 36 and the pawl 46 includes a projection 46a that is at least partially disposed in the recess 36d. Here, in the illustrated embodiment, as shown in FIGS. 4, 5 and 10, the second member 36 includes the recess 36d and the pawl 46 includes the projection 46a. The projection 46a extends outwardly in the axial direction from the pawl 46. As shown in FIGS. 5 and 10, the projection 46a extends in the same direction as the protrusions 34e of the first member 34 when the pawl 46 is disposed in the cutout portion 34f of the first member 34. The recess 36d is larger than the projection 46a to allow a movement of the pawl 46 relative to the ratchet 44 in response to a second rotational movement of the second member 36 relative to the first member 34 in a second rotational direction D2 that is opposite to the first rotational direction D1.

As shown in FIGS. 3 to 5, the cable attachment 40 includes a rod portion 40a rotatably disposed in the attachment bore 34c of the first member. The rod portion 40a includes a fastener receiving aperture 40a1 extending in the axial direction. The cable attachment 40 rotates relative to the first member 34 about the second axis A2 that is parallel to and offset from the first axis A1. The cable attachment 40 further includes a first inner wire contact portion 40b, a second inner wire contact portion 40c and a fixing member 40d. The first inner wire contact portion 40b is stationary with respect to the rod portion 40a. The second inner wire contact portion 40c is movable with respect to the first inner wire contact portion 40b. The fixing member 40d movably couples the second inner wire contact portion 40c to the first inner wire contact portion 40b.

The first inner wire contact portion 40b has a first opening 40b1 aligned with a second opening 40c1 in the second inner wire contact portion 40c. The fixing member 40d, such as a bolt, engages the first and second openings 40b1 and 40c1 to securely retain the inner wire 14b. The first opening 40b1 is preferably threaded to securely receive the fixing member 40d therein. The first opening 40b1 extends substantially perpendicularly to the fastener receiving aperture 40a1.

As shown in FIGS. 4 and 5, the threaded fastener 42 has a head portion 42a and a threaded shaft portion 42b. The threaded shaft portion 42b is threaded into a threaded bore 40a1 of the rod portion 40a of the cable attachment 40 such that the cable attachment 40 is rotatably mounted to the first member 34. The head portion 42a contacts a washer 50 disposed between the head portion 42a and an end of the rod portion 40a, such that the threaded fastener 42 does not contact the first member 34, thereby allowing the cable attachment 40 to rotate relative to the first member 34. A tool receiving opening 42c is disposed in the head portion 42a of the threaded fastener 42 to facilitate receiving a tool to facilitate engaging and disengaging the threaded fastener 42 and the rod portion 40a of the cable attachment 40. The threaded fastener 42 defines the second axis A2.

The first member 34 is mounted to the base portion 22b such that the first member 34 is inserted from the opposite side of the opening 22b1 than the ratchet 44. The flanged portion 34b of the first member 34 abuts the base portion 22b to limit an insertion depth of the first member 34.

The second member 36 is inserted on the opposite side of the opening 22b1 than the first member 34 such that the pair of slots 36c and the recess 36d receive the pair of protrusions 34e and the projection 46a, respectively.

The rod portion 40a of the cable attachment 40 is inserted through the attachment bore 36e of the second member 36 and through the attachment bore 34c of the first member 34.

As shown in FIGS. 3 to 5, the rod portion 40a is inserted from the same side of the opening 22b1 in the base portion 22b as the ratchet 44 and the second member 36.

As shown in FIGS. 1 to 5, the inner wire 14b is secured between the first inner wire contact portion 40b and the second inner wire contact portion 40c. The fixing member 40d is passed through the second opening 40c1 and threadedly engaged with the first opening 40b1 to securely attach the inner wire 14b to the cable attachment 40.

Figure 6:
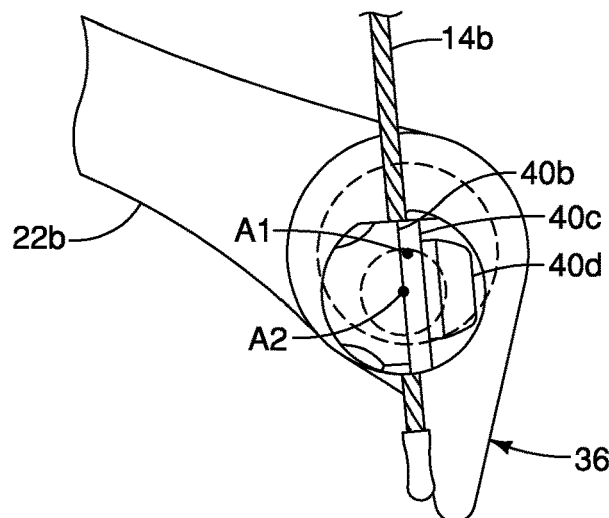
FIG. 6 is a partial rear elevational view of a base portion of a brake arm of the rim brake illustrated in FIG. 1, in which the cable adjuster is in the first end position.

As shown in FIGS. 6, 9 and 10, the biasing element 48 biases the pawl 46 towards the ratchet engaged position. In the ratchet engaged position, as shown in FIG. 10, the pawl 46 engages one of the ratchet teeth 44c, thereby preventing rotation of cable adjuster 10 in the first rotational direction D1.

Figure 11:
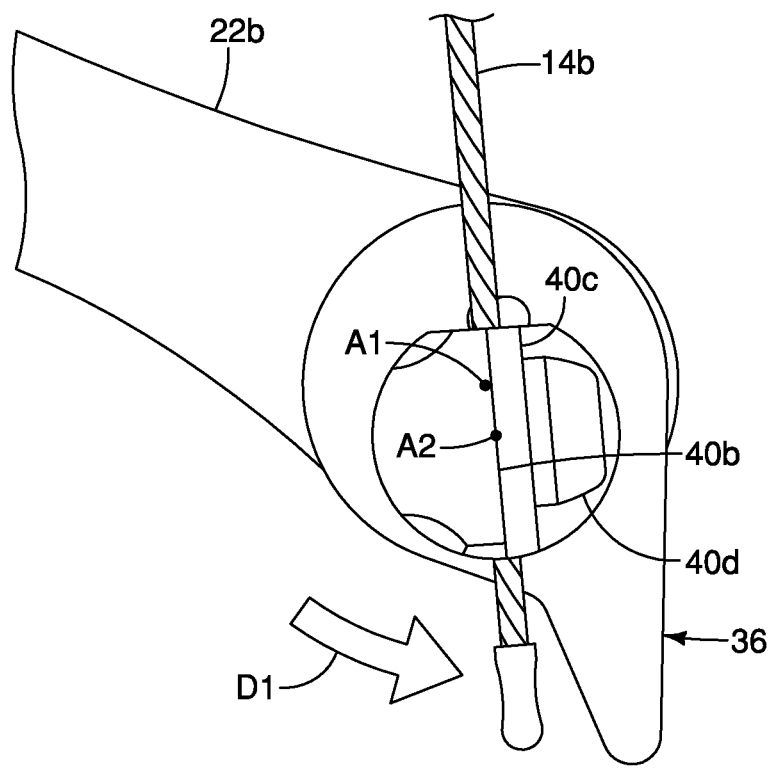
FIG. 11 is a partial rear elevational view, similar to FIG. 6, of the base portion of the brake arm, but in which the user operating portion of the cable adjuster has been moved to disengage a pawl from a ratchet of a clutch mechanism of the cable adjuster.
Figure 12:
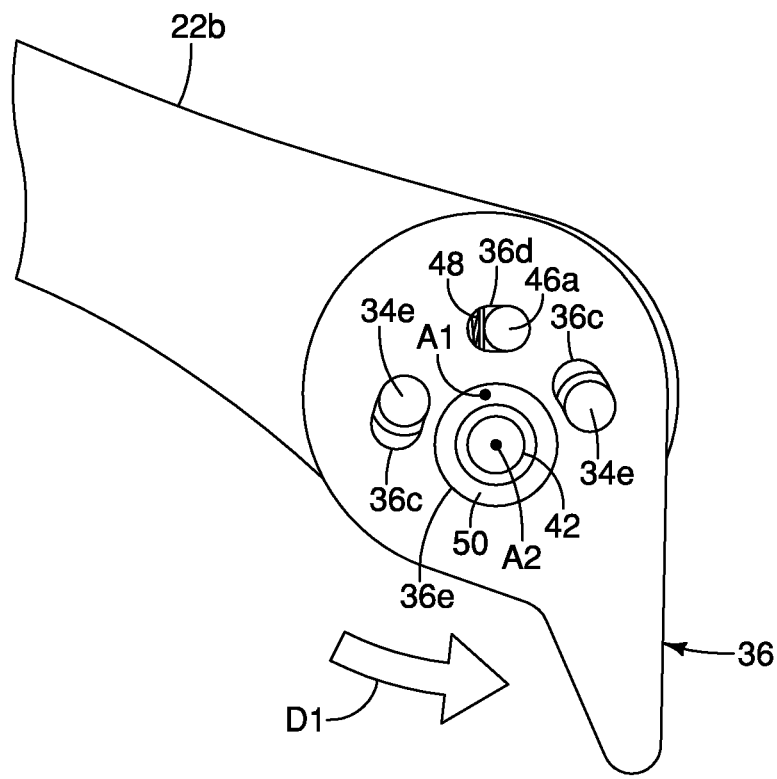
FIG. 12 is a partial rear elevational view of the base portion of the brake arm illustrated in FIG. 11, but in which the cable attachment of the cable adjuster is removed.

To enlarge a clearance between the brake shoes 24, the second member 36 is rotated within the predetermined rotational movement range P (FIG. 13) relative to the first member 34. As shown in FIGS. 11 to 13, the second member 36 is pivoted about the second axis A2 relative to the first member 34 in the first rotational direction D1. The pivotal movement of the second member 36 relative to the first member 34 results in the pair of protrusions 34e being moved from a first end to a second end opposite to the first end in the slots 36c of the second member 36. In other words, as shown in FIG. 9, initially the pair of protrusions 34e are disposed in the first ends of the slots 36c. After the pivotal movement of the second member 36 relative to the first member 34 through the predetermined rotational movement range P (FIG. 13) in the first rotational direction D1, the pair of protrusions 34e are disposed in the second ends of the slots 36c, as shown in FIG. 12. Similar to the pair of protrusions 34e, the pawl projection 46a is moved from a first end to a second end in the recess 36d of the second member 36 in accordance with a rotation of the second member 36 in the first rotational direction D1. In response to this rotation, the second end of the recess 36d of the second member 36 engages the pawl projection 46a, such that further rotational movement of the second member 36 in the first rotational direction D1 overcomes the biasing force of the biasing element 48 and causes the pawl 46 to move within the cutout portion 34f of the first member 34 to the ratchet disengaged position. This movement of the pawl 46 disengages the pawl 46 from the ratchet teeth 44c of the ratchet 44, such that the pawl 46 is in the ratchet disengaged position shown in FIG. 13. Thus, further rotational movement of the second member 36 past the predetermined rotational movement range P in the first rotational direction D1 results in the second member 36 rotating with the first member 34 about the first rotational axis A1.

Figure 7:
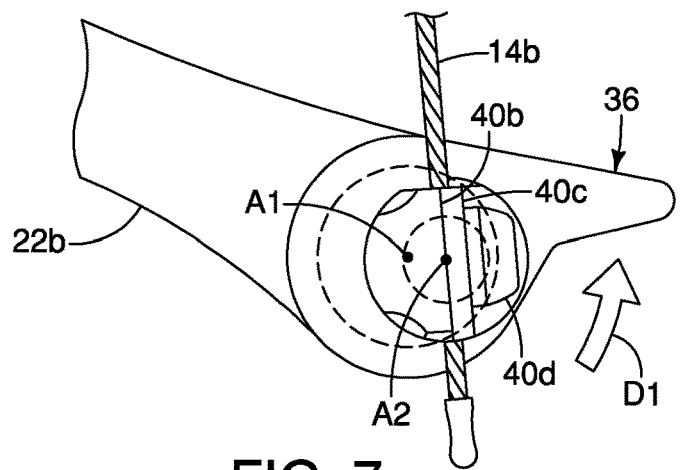
FIG. 7 is a partial rear elevational view, similar to FIG. 6, of the base portion of the brake arm, in which the cable adjuster is in an intermediate position between the first end position and the second end position.
Figure 8:
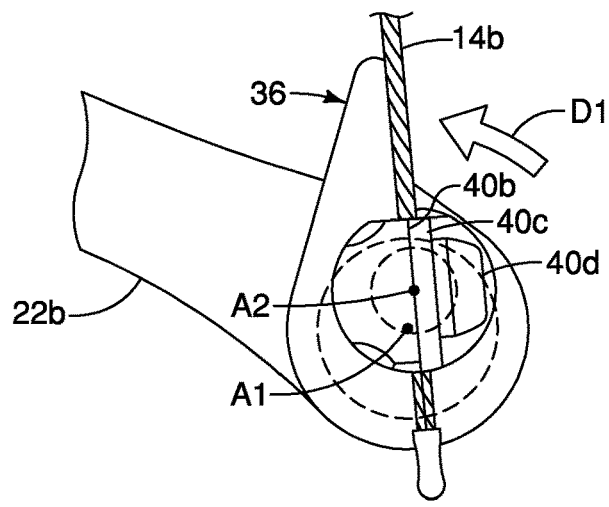
FIG. 8 is a partial rear elevational view, similar to FIGS. 6 and 7, of the base portion of the brake arm, in which the cable adjuster is in the second end position.

The second member 36 is rotated in the first rotational direction D1 from a first end position (FIG. 6) to a second end position (FIG. 8) passing through the predetermined rotational movement range P. In the second end position of the cable adjuster 10, the brake arms 20 and 22 are spread apart such that the wheel W can be removed from the bicycle. As shown in FIGS. 6 to 8, the cable attachment 40 is rotatable relative to the first member 34, such that the cable attachment 40 rotates relative to the first member 34 to prevent bending of the inner wire 14b.

Alternatively, as shown in FIGS. 14 and 15 the second member 36 can be stopped at one of a plurality of intermediate positions from the predetermined rotational movement range P. The second member 36 is rotated over a total angle $\alpha_1$ (FIG. 15) from the first end position of FIG. 6. Releasing the second member 36 causes the biasing element 48 to engage the pawl 46 with the ratchet teeth 44c, thereby substantially preventing further rotational movement in the first rotational direction D1 due to the tension of the inner cable 14b. The ratchet includes at least three ratchet teeth 44c that are selectively engaged with the pawl 46 to establish at least three cable positions. In the illustrated embodiment, the ratchet includes twenty-four ratchet teeth 44c. The ratchet teeth 44c establish positions for the first end position (FIG. 6), the second end position (FIG. 8) and the intermediate positions (FIGS. 7, 14 and 15). Providing the ratchet 44 with more ratchet teeth 44c results in a greater number of intermediate positions being available for positioning the friction members 26 of the brake shoes 24.

Figure 16:
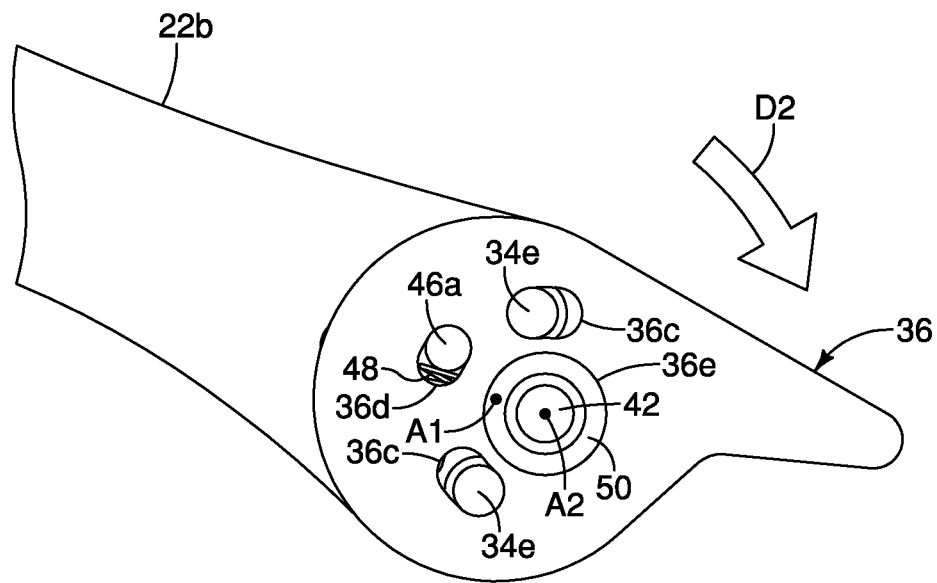
FIG. 16 is a partial rear elevational view, similar to FIG. 9, of the base portion of the brake arm, but in which the cable adjuster has been moved from the position illustrated in FIGS. 14 and 15 to engage the pawl with the ratchet of the clutch mechanism of the cable adjuster.
Figure 17:
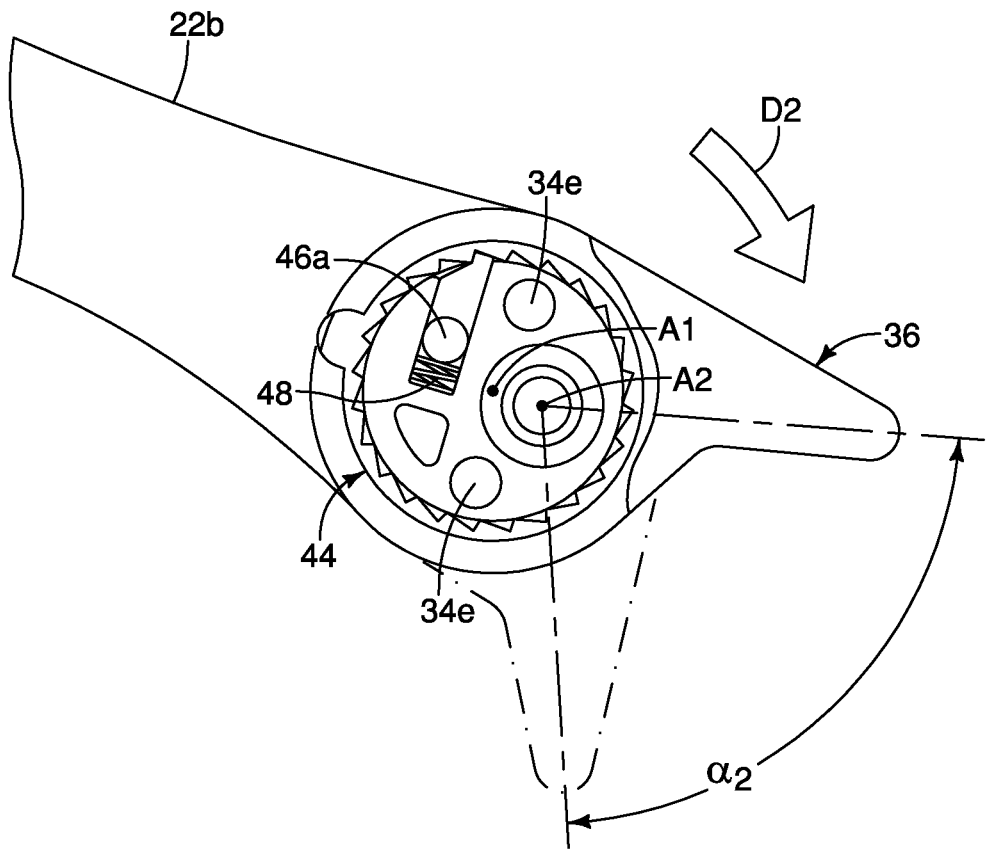
FIG. 17 is a partial rear elevational view of the base portion of the brake arm illustrated in FIG. 16, but the second member of the cable adjuster is removed and in which a portion of the second member of the cable adjuster is broken away.

From the second end position shown in FIG. 8, the second member 36 can be moved in the second rotational direction D2 to an intermediate position shown in FIGS. 16 and 17. The position of the second member 36 relative to the first end position of FIG. 6 forms an angle $\alpha_2$, which is different from the angle $\alpha_1$ shown in FIG. 15 corresponding to the predetermined rotational movement range P. The second rotational direction D2 is opposite to that of the first rotational direction D1. The configuration of the ratchet teeth 44c allows the pawl 46 to slide over the ratchet teeth 44c when the second member 36 is moved in the second rotational direction. When the friction members 26 are in the desired position, such as the intermediate position shown in FIGS. 16 and 17, the second member 36 is released. The biasing element 48 biases the pawl 46 to the ratchet engaged position, thereby substantially preventing rotation of the second member 36 due to the tension of the inner wire 14b. Accordingly, the cable adjuster 10 allows a user to quickly and easily move the first brake arm 20 and the second brake arm 22 apart, as indicated by the directional arrows in FIG. 2, such that the bicycle wheel W can be removed, as well as providing a desired intermediate position of the friction members 26 between the first end position and the second end position.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a bicycle in an upright, riding position and equipped with the cable adjuster. Accordingly, these directional terms, as utilized to describe the cable adjuster should be interpreted relative to a bicycle in an upright riding position on a horizontal surface and that is equipped with the cable adjuster. The terms "left" and "right" are used to indicate the "right" when referencing from the right side as viewed from the rear of the bicycle, and the "left" when referencing from the left side as viewed from the rear of the bicycle.

Also, it will be understood that although the terms "first" and "second" may be used herein to describe various components, these components should not be limited by these terms. These terms are only used to distinguish one component from another. Thus, for example, a first component discussed above could be termed a second component and vice versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A cable adjuster for a small vehicle, the cable adjuster comprising:
   a base portion; and
   a control structure including:
      a first member configured to be rotatably mounted to the base portion about a first axis;
      a second member rotatably attached to the first member to rotate relative to the first member; and
      a clutch mechanism configured to transmit rotational force applied to the second member to the first member and to prevent from transmitting rotational force applied on the first member to the second member.

2. The cable adjuster according to claim 1, wherein the clutch mechanism includes
   a ratchet configured to be mounted to one of the base portion and the first member, and
   a pawl configured to be movably mounted to the other of the base portion and the first member between a ratchet engaged position and a ratchet disengaged position, the pawl being operatively coupled to the second member to move from the ratchet engaged position to the ratchet disengaged position in response to a first rotational movement of the second member relative to the first member in a first rotational direction.

3. The cable adjuster according to claim 2, wherein the clutch mechanism further includes a biasing element that biases the pawl towards the ratchet engaged position.

4. The cable adjuster according to claim 2, wherein the ratchet is configured to be mounted to the base portion, and the pawl is configured to be movably mounted to the first member.

5. The cable adjuster according to claim 4, wherein the ratchet includes a ring portion having ratchet teeth circumferentially arranged along a radially inner side of the ring portion, and a key portion projecting from the ring portion to position the ratchet relative to the base portion.

6. The cable adjuster according to claim 4, wherein the one of the second member and the pawl includes a recess, and the other of the second member and the pawl includes a projection that is at least partially disposed in the recess.

7. The cable adjuster according to claim 6, wherein the first member includes the recess and the pawl includes the projection.

8. The cable adjuster according to claim 6, wherein the recess is larger than the projection to allow a movement of the pawl relative to the ratchet in response to a second rotational movement of the second member relative to the first member in a second rotational direction that is opposite to the first rotational direction.

9. The cable adjuster according to claim 2, wherein the ratchet includes at least three ratchet teeth that are selectively engaged with the pawl to establish at least three cable positions.

10. The cable adjuster according to claim 1, wherein the second member is configured to rotate within a predetermined rotational movement range relative to the first member and to rotate with the first member after rotational movement past the predetermined rotational movement range.

11. The cable adjuster according to claim 10, wherein one of the first and second members includes at least one slot, and the other of the first and second members includes at least one protrusion, the at least one protrusion is at least partially disposed in the at least one slot to limit relative rotational movement of the second member relative to the first member to the predetermined rotational movement range.

12. The cable adjuster according to claim 11, wherein the at least one slot includes a pair of slots and the at least one protrusion includes a pair of protrusions.

13. The cable adjuster according to claim 1, wherein the second member includes a user operating portion.

14. The cable adjuster according to claim 1, wherein the second member rotates relative to the first member about a second axis that is parallel to and offset from the first axis.

15. The cable adjuster according to claim 1, further comprising
a cable attachment rotatably supported on the first member.

16. The cable adjuster according to claim 15, wherein the cable attachment rotates relative to the first member about a second axis that is parallel to and offset from the first axis.

17. The cable adjuster according to claim 16, wherein the first member includes a cylindrically shaped outer surface having a center of curvature coinciding with the first axis, and an attachment bore defining the second axis, the cable attachment including a rod portion rotatably disposed in the attachment bore.

18. The cable adjuster according to claim 17, further comprising
a threaded fastener having a head portion contacting the first member and a threaded shaft portion threaded into a threaded bore of the rod portion of the cable attachment.

19. The cable adjuster according to claim 15, wherein the cable attachment further includes a first inner wire contact portion that is stationary with respect to the rod portion, a second inner wire contact portion that is movable with respect to the first inner wire contact portion, and a fixing member movably coupling the second inner wire contact portion to the first inner wire contact portion.

20. A rim brake including the cable adjuster according to claim 1, the rim brake further comprising
a first brake arm including a first brake shoe attachment structure, and an outer casing receiving structure, and
a second brake arm including a second brake shoe attachment structure and the base portion.

* * * * *